(12) United States Patent
Park et al.

(10) Patent No.: US 9,961,247 B2
(45) Date of Patent: May 1, 2018

(54) CAMERA HAVING LIGHT EMITTING DEVICE, METHOD FOR IMAGING SKIN AND METHOD FOR DETECTING SKIN CONDITION USING THE SAME

(71) Applicant: Seoul Viosys Co., Ltd., Gyeonggi-do (KR)

(72) Inventors: Stella Park, Ansan-si (KR); Seong-Tae Jang, Seoul (KR); Sung-Il Park, Daejeon (KR); Ji-Ye Song, Bucheon-si (KR)

(73) Assignee: Seoul Viosys Co., Ltd., Ansan-si (KR)

( * ) Notice: Subject to any disclaimer, the term of this patent is extended or adjusted under 35 U.S.C. 154(b) by 243 days.

(21) Appl. No.: 14/832,947

(22) Filed: Aug. 21, 2015

(65) Prior Publication Data
US 2016/0057325 A1 Feb. 25, 2016

(30) Foreign Application Priority Data
Aug. 22, 2014 (KR) .......................... 10-2014-0109866

(51) Int. Cl.
*H04N 7/18* (2006.01)
*H04N 5/225* (2006.01)
*H04N 5/232* (2006.01)

(52) U.S. Cl.
CPC ....... *H04N 5/2256* (2013.01); *H04N 5/23229* (2013.01)

(58) Field of Classification Search
None
See application file for complete search history.

(56) References Cited

U.S. PATENT DOCUMENTS

| | | | |
|---|---|---|---|
| 2007/0040907 A1* | 2/2007 | Kern | A61B 5/0059 348/77 |
| 2014/0028825 A1* | 1/2014 | Yamagata | H04N 5/2621 348/77 |
| 2015/0023019 A1* | 1/2015 | Chen | H05B 33/0803 362/276 |

FOREIGN PATENT DOCUMENTS

| KR | 1020080069730 A | 7/2008 |
|---|---|---|
| KR | 1020090041384 A | 4/2009 |

OTHER PUBLICATIONS

Jeong, C. B. et al., "Evaluating the Efficacy of Whitening Products by Using Luminescence Measurement and Revealing Correlation between Luminescence and Other Paramaters", J. Soc. Cosemt. Scientists Korea, vol. 36, No. 4, Dec. 2010, pp. 253-258 (English abstract provided).

(Continued)

*Primary Examiner* — James M Anderson, II
(74) *Attorney, Agent, or Firm* — Perkins Coie LLP

(57) ABSTRACT

A camera having light emitting devices includes a light emitting unit configured to irradiate light to a skin, and a light receiving unit configured to receive reflected light which is generated when the light irradiated by the light emitting unit is reflected from the skin. The light emitting unit comprises a plurality of sets of the light emitting devices, and each of the sets includes one or more light emitting devices which are configured to irradiate the light with the same wavelength. In addition, each of the sets is configured to sequentially irradiate the light and irradiate light with a wavelength that is different from other sets. By using the camera, it is possible to obtain information of the skin for each wavelength by sequentially irradiating light with wavelengths different from other sets, reduce distorted information, and perform an accurate diagnosis.

20 Claims, 10 Drawing Sheets

(56) References Cited

OTHER PUBLICATIONS

Office Action in Chinese Patent Application No. 2015105239795, dated Jan. 3, 2018.

* cited by examiner

CAMERA HAVING LIGHT EMITTING DEVICE, METHOD FOR IMAGING SKIN AND METHOD FOR DETECTING SKIN CONDITION USING THE SAME

CROSS REFERENCE TO RELATED APPLICATION

This patent document claims priority from and the benefits of Korean Patent Application No. 10-2014-0109866, filed on Aug. 22, 2014, entitled "CAMERA HAVING LIGHT EMITTING DEVICE, METHOD FOR IMAGING SKIN AND METHOD FOR DETECTING SKIN CONDITION USING THE SAME", which is hereby incorporated by reference in its entirety.

TECHNICAL FIELD

The disclosed technology relates to a camera having light emitting devices and a method for imaging a skin using the same, and more particularly, to a detection technology using a plurality of light emitting devices as a light source to sequentially irradiate light having wavelengths different from each other.

BACKGROUND

Measuring reflectivity of a skin depending on wavelengths of light enables analyzing a distribution of various components in a skin tissue or an aging status of the skin.

As a related art, Korean Patent laid-open publication No. 10-2008-0069730 discloses a multifunctional digital skin imaging apparatus and a method for analyzing image. The skin imaging apparatus disclosed in Korean Patent laid-open publication No. 10-2008-0069730 includes a light source unit, a charge coupled device (CCD) camera, and a rotary filter wheel end having one or more optical filters, wherein one of the optical filters having a wavelength selecting function is selected with rotating of the rotary filter wheel end and is located in front of a lens of the CCD camera. However, since the skin imaging apparatus uses the filter, the cost increases at the time of its actual implementation, and images are distorted due to a second characteristic caused by the filter. Further, since the skin imaging apparatus has to measure light passed through the filter, it is difficult to measure light with a weak wavelength. In addition, the skin imaging apparatus is bulky so that an individual cannot carry for using it.

As another related art, Korean Patent laid-open publication No. 10-2009-0041384 discloses a camera for examing the condition of skin. The camera disclosed in Korea Patent laid-open publication No. 10-2009-0041384 includes an ultraviolet filter which transmits a certain range of wavelengths and a polarization filter which separates light generated in reaction to a sebum of the skin, thereby allowing a user to determine a status of the sebum according to a specific color. However, the wavelength in the camera is limited to a specific wavelength to react with the sebum. Further, the camera employing the ultraviolet filter encounters the above described problems such as the increased cost due to the filter, image distortion, and limitation of measurable wavelength, etc.

SUMMARY

In view of the above, the disclosed technology provide a camera having light emitting devices which is capable of specifically and generally measuring a status of a skin based on one factor as well as a number of factors and which is compact, simple, inexpensive, and portable, and a method for imaging the skin and detecting a skin status using the same.

In one aspect, there is provided a camera having light emitting devices, which includes: a light emitting unit configured to irradiate light to a skin; and a light receiving unit configured to receive reflected light which is generated when the light irradiated by the light emitting unit is reflected from the skin. The light emitting unit includes a plurality of sets of the light emitting devices, and each of the sets includes one or more light emitting devices which are configured to irradiate the light with the same wavelength. In addition, each of the sets is configured to sequentially irradiate the light a with a wavelength that is different from other sets.

In some implementations, the sets include the light emitting devices arranged in the same pattern. In some implementations, the pattern has a symmetric form with respect to the light receiving unit.

In some implementations, the camera having light emitting devices further includes a driving unit which is electrically connected to the light emitting unit and configured to transmit an independent driving signal to each of the sets.

In some implementations, the light emitting unit further includes a first polarizer which is configured to polarize the light irradiated by the light emitting devices to a first direction; and the light receiving unit includes an imaging element and a second polarizer which is configured to polarize the reflected light to a second direction and to make the reflected light incident to the imaging element. In some implementations, the first direction and the second direction are parallel to each other. In some implementations, the second direction is different from the first direction.

In some implementations, the camera having light emitting devices further includes a body which is coupled to the light emitting unit, the body having an opening configured to allow the light to pass through. In some implementations, the light emitting unit further includes light transferring devices which are configured to make the light irradiated by the light emitting devices incident to the opening. In some implementations, the light transferring devices comprises reflecting plates or optical cables.

In another aspect, there is provided a method for imaging a skin, which includes: irradiating light to the skin of a target by sequentially turning on a plurality of sets of the light emitting devices; and receiving at the light receiving unit reflected light which is generated from the plurality of sets and reflected from the skin of the target, wherein each set comprises one or more light emitting devices which are configured to irradiate light with the same wavelength that is different from other sets.

In some implementations, irradiating light to the skin of a target includes turning on each of the sets by using an independent driving signal.

In some implementations, irradiating light to the skin of a target includes polarizing the light from the light emitting devices to a first direction using a first polarizer. In some implementations, receiving reflected light at the light receiving unit includes polarizing the reflected light to a second direction using a second polarizer. In some implementations, the first direction and the second direction are parallel to each other. In some implementations, the first direction is different from the first direction.

In an embodiment of imaging a skin, the light emitting devices are disposed in a body having an opening through which light passes; and irradiating light to the skin of a target includes: making the light irradiated from the light emitting devices incident to the opening by using a light transferring devices. In some implementations, the light transferring devices may include reflecting plates or optical cables.

By using the camera having light emitting devices in accordance with an aspect of the disclosed technology, it is possible to obtain information of the skin using different wavelengths by sequentially irradiating light with different wavelengths. Further, the use of the polarizer may reduce distorted information, and adjust a polarization direction of the irradiated light and the reflected light with parallel polarization, cross polarization, or non-polarization modes. Thus, it is possible to perform an accurate diagnosis. Additionally, each set of the light emitting devices is driven by a separate driving signal to adjust an electrical characteristic for each wavelength of each set of light emitting devices, which contributes to producing the same amount of light.

DETAILED DESCRIPTION

Hereinafter, exemplary embodiments of the disclosed technology will be described in more detail with reference to accompanying drawings.

Figure 1A:
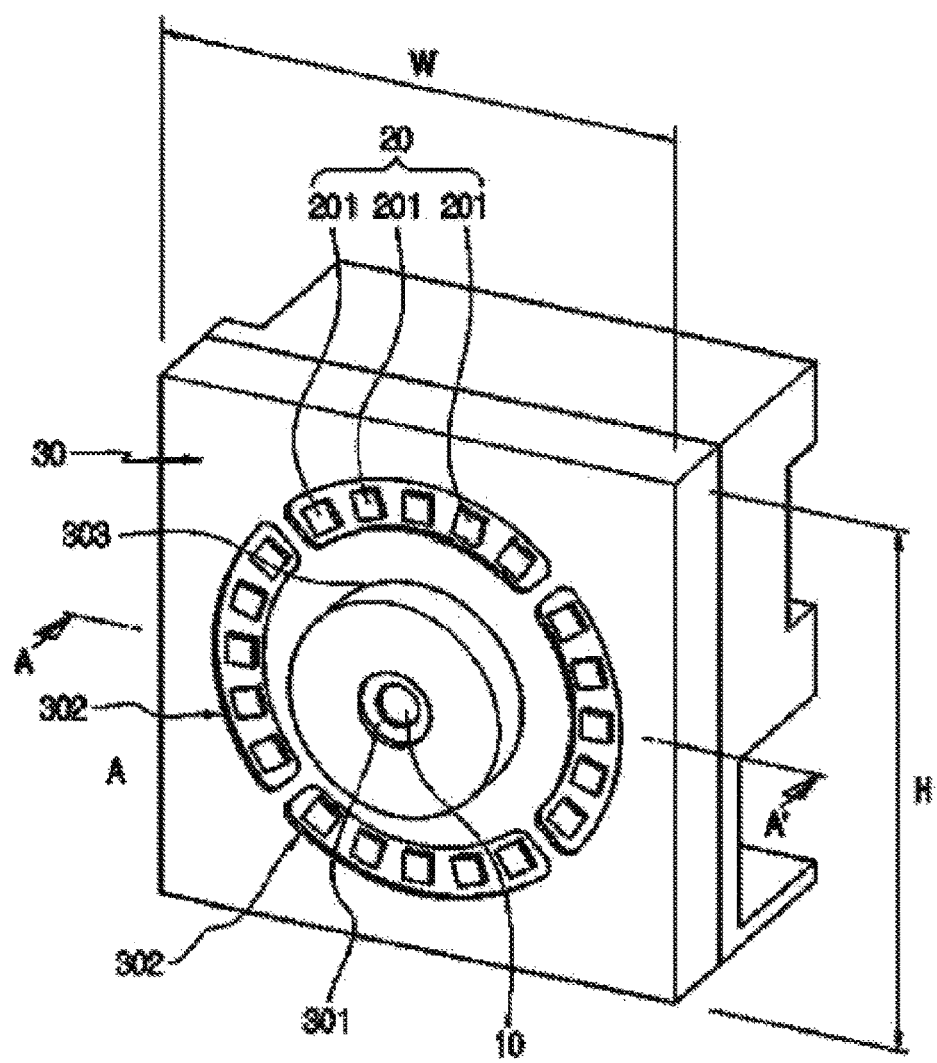
FIG. 1A is a perspective view of an exemplary camera having light emitting devices in accordance with an embodiment.
Figure 1B:
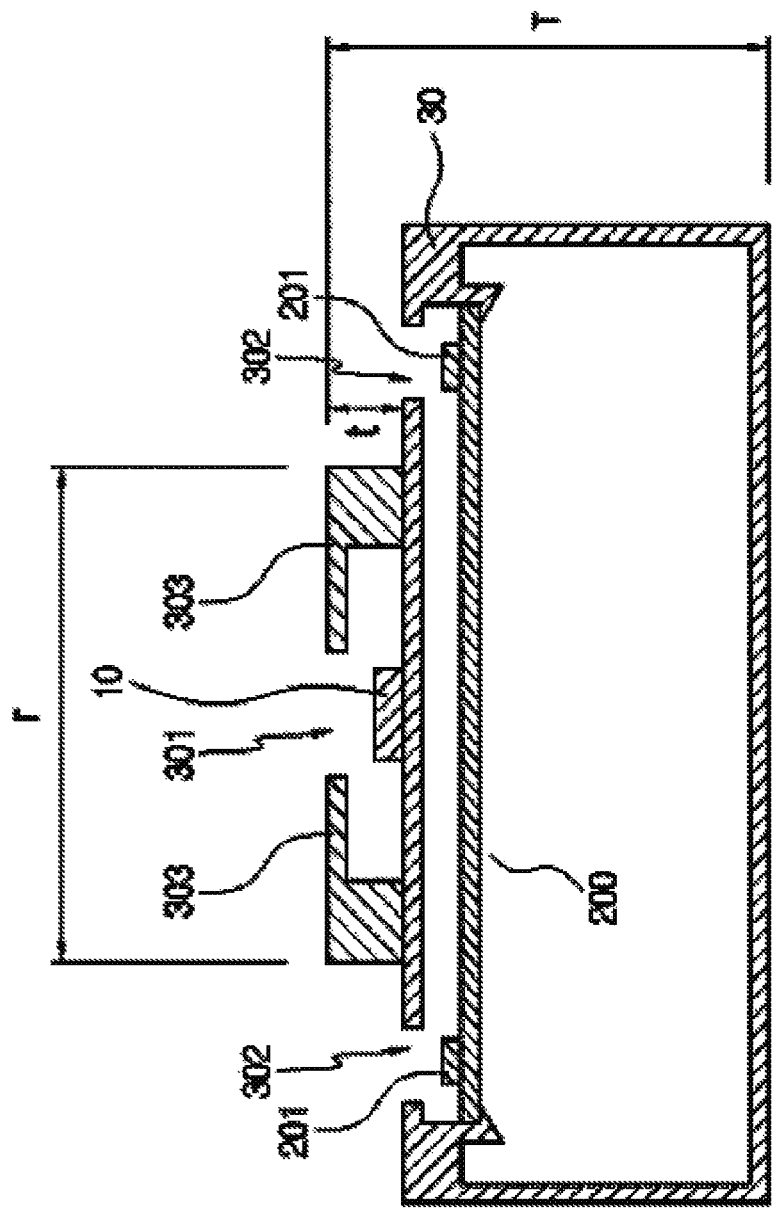
FIG. 1B is a sectional view taken along lines A-A' of FIG. 1A.

FIG. 1A is a perspective view of a camera having light emitting devices in accordance with an embodiment, and FIG. 1B is a sectional view taken along lines A-A' of FIG. 1A.

Referring to FIGS. 1A and 1B, a camera having light emitting devices according to an embodiment includes a light receiving unit 10 and a light emitting unit 20. The light emitting unit 20 includes a plurality of light emitting devices 201 configured to irradiate light with wavelengths different from one another. For example, the light emitting devices 201 may be a light emitting diode (LED), but is not limited thereto. The plurality of light emitting devices 201 are configured to sequentially irradiate light. In other words, the plurality of light emitting devices 201 may irradiate the light by alternately being turned-on/turned-off for each time period. In an embodiment, a wavelength of light being irradiated from each of the light emitting devices 201 may be selected within a wavelength bandwidth in a range of about 200 nm to 1500 nm. Although the drawings illustrate a configuration in which the light emitting devices 201 are arranged along a circle at which the light receiving unit 10 is a center of the circle, it is understood that this is just an example and the number and arrangement of the light emitting devices 201 as well as the size and shape of the light emitting devices 201 are not limited to those illustrated in drawings.

The light receiving unit 10 is configured to image the target by receiving the light that is irradiated from the plurality of light emitting devices 201 in the light emitting unit 20 and reflected from the target. The light receiving unit 10 may include a charge coupled device- (CCD-)based imaging device, a complementary metal-oxide semiconductor- (CMOS-)based imaging device, or any other suitable imaging device. In an embodiment, the light receiving unit 10 may be located at the center of the light emitting devices 201 so that the light receiving unit 10 can receive the light with the same intensity, which has the different wavelengths created by the respective light emitting devices 201.

Light at various wavelengths is sequentially irradiated to the target from a plurality of light emitting devices 201 and is reflected from the target. The light receiving unit 10 is configured to image the target in a way of sequentially receiving the reflected light of the respective wavelengths. In an embodiment, the light receiving unit 10 may be configured to image the target in synchronization with each of the light emitting devices 201 when light is irradiated from each of the light emitting devices 201. As a result, the light receiving unit 10 may obtain a plurality of images for wavelengths corresponding to the plurality of light emitting devices 201. In another embodiment, the light receiving unit 10 may be configured to sequentially image the target during each of the light emitting devices 201 is turned-on in order thereby completing lighting of all the light emitting devices 201. In this case, a plurality of images for wavelengths may be obtained by performing a post-processing on the images which are sequentially imaged in the light receiving unit 10.

In accordance with an embodiment, the camera having light emitting devices may be used to image the skin of a target. In the target such as a human being or animal, the reflected light from the skin may include various pieces of information related to the target's physical condition. Further, a color of the skin, an elasticity of the skin, a blemish existed on the skin, or the number and size of wrinkle may also become an observation object for the purpose of cosmetic. The camera having light emitting devices may be utilized to obtain images of the skin for wavelengths (wavelength-specific image), and therefore, it is possible to measure a distribution of various components in the skin or an oxygen distribution in a blood vessel contiguous to the skin.

For example, it is known that a moisture, melanin, lipid, collagen, elastin, etc. in the skin, and oxyhemoglobin and deoxyhemoglobin in the blood vessel contiguous to the skin may influence on an absorption rate of the light with a specific wavelength irradiated to the skin. As listed in the below Table 1, the distribution of the collagen and melanin in the skin, the distribution of oxyhemoglobin and deoxyhemoglobin in the blood vessel, a skin depth and an amount of moisture in the skin, etc. are associated with the elasticity of the skin, a skin darkness, a hyperoxidation, an age and/or a gender, a dehydration, etc., and also influence on a spectrum of the light reflected from the skin at a specific wavelength bandwidth.

TABLE 1

| INDEX | RELEVANT PHYSICAL CONDITION | CORRESPONDING WAVELENGTH BANDWIDTH (nm) |
|---|---|---|
| Collagen | Elasticity | 290 to 1150 |
| Melanin | Skin darkness | 350 to 750 |
| Oxyhemoglobin | Hyperoxidation | 550 to 590 |
| Deoxyhemoglobin | Hyperoxidation | 410 to 450 |
| Skin depth | Age/Gender | 450 to 650 |
| Moisture | Dehydration | 250 to 450 |
|  |  | 750 to 1150 |

Accordingly, in the camera having light emitting devices in accordance with an embodiment, the wavelength of light being irradiated by the plurality of light emitting devices 201 is determined at least partly based on the kind of components in the skin or the blood vessel to be measured. By defining components such as collagen, melanin, oxyhemoglobin, deoxyhemoglobin, skin depth, and moisture to the skin as indices, irradiating light having wavelength corresponding to each of indices to the skin, and measuring a reflected rate of the light reflected from the skin, it is possible to find out the distribution of the component concerned in the skin or the blood vessel. However, this is just an example, and the indices which will be observed by the camera having light emitting devices and the wavelength of the light which is being irradiated by the light emitting devices 201 are not limited to those in Table 1. In addition, apart from the light with the wavelengths corresponding to the specific indices, any other light emitting devices 201 may be further provided to irradiate light for data correction or other purpose.

In an embodiment, each of the light receiving unit 10 and the light emitting unit 20 further includes a polarizer (not shown) which is configured to adjust a polarization direction of the light. The polarizer, which may be implemented in various forms such as a polarizing plate, a polarizing filter, or a polarizing film, is configured to polarize the light irradiated by the light emitting unit 20 and the reflected light received by the light receiving unit 10 to the specific direction. Each of the polarizers may be detachably coupled to each of the light receiving unit 10 and the light emitting unit 20, respectively. Further, the polarizer(s) coupled to the light receiving unit 10 and/or the light emitting unit 20 may be configured to adjust the polarization direction by allowing a user to rotate it. The polarizer(s) will be described in detail with reference to FIG. 2.

In an embodiment, the camera having light emitting devices further includes a body 30 to which the light receiving unit 10 and the light emitting unit 20 are coupled. The body 30 may have a first opening 301 formed thereon through which the light from the outside is received to the light receiving unit 10. The body 30 may further have a second opening 302 formed thereon through which the light from the light emitting unit 20 is irradiated to the outside. The second opening 302 may be plural depending on the number of the light emitting devices 201, or one second opening 302 may also be configured to irradiate the light from the plurality of light emitting devices 201 therethrough.

In addition, an optically transparent material such as glass, quartz, PMMA or the like may be coupled to each of the openings 301 and 302.

In an embodiment, the body 30 further includes a cover 303 which encloses the light receiving unit 10 and it's around area. In this case, the first opening 301 may be formed with the cover 303 to be arranged with the light receiving unit 10.

In an embodiment, the light emitting unit 20 includes a substrate 200 which supports the plurality of light emitting devices 201 arranged on the substrate 200. For example, the substrate 200 may be a printed circuit board (PCB), but not limited thereto. The substrate 200 may be positioned in the body 30 and thus may be coupled to the body so that the plurality of light emitting devices 201 on the substrate 200 are arranged with the second opening 302. Coupling the light receiving unit 10 and the light emitting unit 20 to the body 30 may be performed by using various coupling members well-known in the art, and a further description thereof will be omitted for clarity of the subject of the invention.

Although it is not illustrated in drawings, the camera having light emitting devices in accordance with the embodiments may further include a control circuit and a power source unit. The control circuit and the power source unit may be located in the body 30 and electrically connected to the light receiving unit 10 and the light emitting unit 20. The power source unit may be in the form of a battery, or it may be configured to receive electrical power through a wire connection from an external power source.

In accordance with embodiments, the camera having light emitting devices may be compact enough to carry easily by a user. For example, in an embodiment, the width W and height H of the body 30 may be about 110 mm and about 120 mm, respectively. Further, the thickness T of the body 30 may be about 58 mm. In addition, in an embodiment, the thickness t of the cover 303 which encloses the light receiving unit 10 may be about 10 mm, and the diameter r of the light receiving unit 10 may be about 54.5 mm. However, the aforementioned numerical values are just an example and a specific shape and dimension for each portion of the camera having light emitting devices may be different from embodiments described in this patent document, depending on a size and a shape of respective components which constitute the camera.

Figure 2:
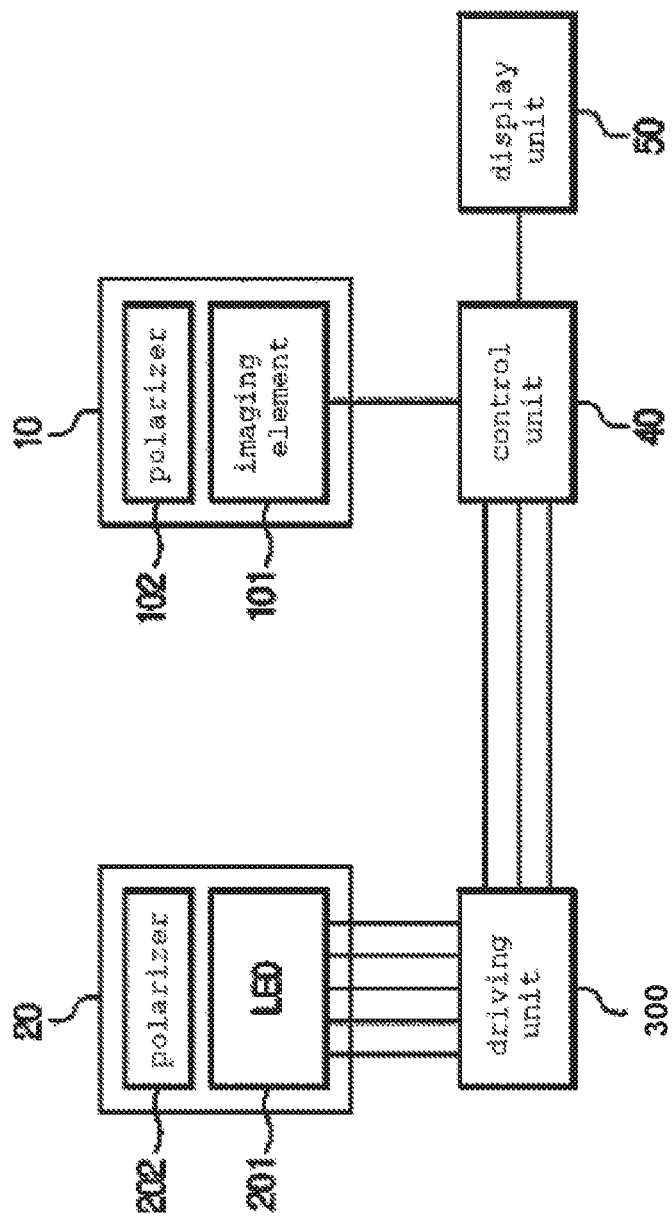
FIG. 2 is a schematic block diagram of an exemplary camera having light emitting devices in accordance with an embodiment.

FIG. 2 is a schematic block diagram of a camera having light emitting devices in accordance with an embodiment.

Referring to FIG. 2, the camera having light emitting devices include a driving unit 300 and a control unit 40, as well as the light receiving unit 10 and the light emitting unit 20. Similarly to the exemplary embodiment described with reference to FIG. 1, the light emitting unit 20 includes a plurality of light emitting devices 201 configured to sequentially turn-on and irradiate light with wavelengths different from each other. In addition, the light receiving unit 10 includes an imaging element 101 which receives the reflected light which is irradiated from the plurality of light emitting devices 201 and then reflected from the target.

In an embodiment, the light receiving unit 10 includes a first polarizer 102, and the light emitting unit 20 includes a second polarizer 202. The first and second polarizers 102 and 202 are configured to polarize the light passing through the first and second polarizers 102 and 202 to a predetermined specific direction. In the disclosed technology, a direction polarized by the first polarizer 102 refers to a first direction, and a direction polarized by the second polarizer 202 refers to a second direction. It is known that a polarized light of the light reflected from the skin is influenced by a location at which the light is reflected. When the light is reflected from a surface of the skin, there is no change in the polarization direction or there is relatively a slight change if any. However, when the light is reflected from the skin after penetrating the skin up to certain depth, there is a change in the polarization direction compared with the incident light. Accordingly, appropriately adjusting the polarized direction by the first and second polarizers 102 and 202 may enable obtaining wanted information on the skin through the light reflected from the skin.

In an embodiment, the first direction and the second direction are determined to be parallel with each other. In this regard, the light irradiated by the light emitting devices 201 is polarized to a specific direction by passing through the second polarizer 202 and then irradiated to a target. Next, the light reflected from the target passes through the first polarizer 102, and thus only a component toward the specific direction among the reflected light is received through the imaging element 101. In this embodiment, it is to easily detect the reflected light from the surface of the skin which has no change or a slight change in the polarized direction when the light is reflected from the skin.

In another embodiment, the first direction and the second direction are determined to be different from each other. For example, the first direction and the second direction may be determined to be perpendicular with each other. In this case, the light irradiated from the light emitting devices 201 is polarized to a specific direction and then irradiated to a target by passing through the second polarizer 202. However, the light reflected from the target is passed through the first polarizer 102 and thus only a component toward the polarization direction different from the specific direction is received and detected through the imaging element 101. In this case, the light is deeply penetrated into the inside of the skin and then is reflected from the inside of the skin, which enables detecting the light reflected from the inside of the skin at which the polarization direction is rotated by 90° or otherwise there is a change in the polarization direction.

In another embodiment, it may be configured to irradiate the light to the target in order to get the polarization components in all directions without using the first and second polarizers 102 and 202 and measure the reflected light including the polarization components in all directions.

The driving unit 300 is electrically connected to the light emitting unit 20 and the control unit 40. The driving unit 300 is driven under the control of the control unit 40 to provide driving signals for turning on the plurality of light emitting devices 201. In an embodiment, the driving unit 300 provides an independent driving signal to each of the plurality of light emitting devices 201. The plurality of light emitting devices 201 are configured to irradiate the light with wavelengths different from one another, wherein an amount of the light suitable for imaging the skin and measuring the status of the skin, a change of the wavelength, a current, and the like may be differed depending on the wavelengths. The driving unit 300 transmits separate driving signals having optimized electrical characteristics for imaging to the light emitting devices 201 so that optimal measuring results can be obtained through the use of a number of wavelengths.

The control unit 40 is electrically connected to the driving unit 300 and the light receiving unit 10 and configured to include a microprocessor or other suitable processing unit. For example, the control unit 40 may be or include, but is not limited, a single-board computer. The control unit 40 may control the driving unit 300 so that the driving unit 300 can transmit a timing-controlled driving signal for sequentially turning on the plurality of light emitting devices 201. The control unit 40 may also control the light receiving unit 10 so that the light receiving unit 10 receives reflected light which is irradiated from the plurality of light emitting devices 201 and then reflected from the skin. For example, the control unit 40 may synchronize imaging instances by the light receiving unit 10 with the respective driving signals. In an embodiment, the control unit 40 may analyze images which are imaged by the light receiving unit 10 and obtain information of the target corresponding to the wavelengths through the use of a processing unit.

In an embodiment, the camera having light emitting devices may further include a display unit 50. The display unit 50 may display images of the target obtained by the imaging element 101 of the light receiving unit 10. Further, the display unit 50 may display a graphic user interface (GUI) enabling a user to control an operation of the camera having light emitting devices. The display unit 50 may be configured with a display means such as a liquid crystal display (LCD), but is not limited thereto.

Figure 3:
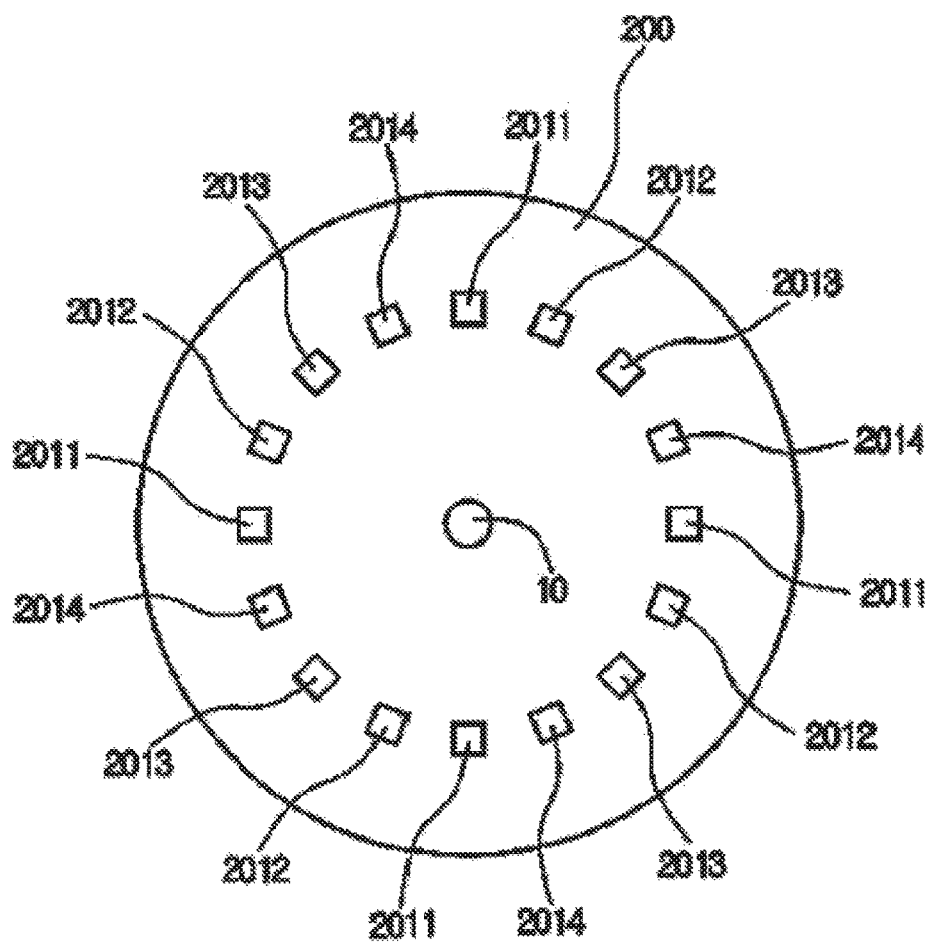
FIG. 3 is a top plan view illustrating an exemplary arrangement of light emitting devices in a camera having light emitting devices in accordance with an embodiment.

FIG. 3 is a top plan view illustrating an arrangement of light emitting devices in a camera having light emitting devices in accordance with an embodiment.

Referring to FIG. 3, in the present embodiment, a plurality of light emitting devices 2011, 2012, 2013 and 2014 disposed on the substrate 200 are divided into several sets by the kinds of the light emitting devices 2011, 2012, 2013 and 2014. In other words, the light emitting devices may be divided into a first set composed of the first light emitting devices 2011, a second set composed of the second light emitting devices 2012, a third set composed of the third light emitting devices 2013, and a fourth set composed of the fourth light emitting devices 2014. Each of the sets is composed of same kind of four light emitting devices, and the light emitting devices which are included in each set and have the same reference numeral are configured to irradiate the light having the same wavelength.

The light emitting devices in each set are configured to irradiate the light with the wavelength different from the light emitting devices in other sets, and four sets are sequentially turned-on. For example, at a first time period, only four first light emitting devices 2011 are turned-on such that the light with first wavelength may be irradiated. At a second time period, the first light emitting devices 2011 are turned off and only four second light emitting devices 2012 are turned on such that the light with second wavelength different from the first wavelength may be irradiated. At a third time period, the second light emitting devices 2012 are turned off and only four third light emitting devices 2013 are turned on such that the light with third wavelength different from the first and second wavelengths may be irradiated. At last, at a fourth time period, the third light emitting devices 2013 are turned off and only four fourth light emitting devices 2014 are turned on such that the light with fourth wavelength different from the first to third wavelengths may be irradiated.

In an embodiment, the light emitting devices included in each set are arranged in the same pattern. Moreover, this pattern may have a symmetrical shape with respect to the light receiving unit 10. In other words, the light emitting devices are arranged to be evenly disposed in each of directions from the light receiving unit 10. For example, in FIG. 3, four first light emitting devices 2011 are arranged at regular intervals along a virtual circle at which the light receiving unit 10 is a center of the circle. Likewise, the second to fourth light emitting devices 2012, 2013, and 2014 are also arranged to have the same pattern as the first light emitting devices 2011, but are arranged to have a pattern which is rotated by certain angle compared to the pattern of the first light emitting devices 2011. Since each set composed of the light emitting devices irradiates the light with wavelengths different from one another, an amount of light or a type of light being irradiated to a target or focused at a target may be changed depending on the wavelengths of light if the light emitting devices in each set have different patterns. Thus, in an embodiment, the light emitting devices included in each set have the same pattern, thereby avoiding measurement errors due to the wavelengths or the locations.

In an embodiment illustrated in FIG. 3, four sets of light emitting devices are configured in a way that four kinds of the light emitting devices irradiate light with wavelengths different from one another and each set includes the same kind of four light emitting devices. However, the above configuration is just an example for the convenience of explanation, and the number of the sets of the light emitting devices and the number of the light emitting devices in each set may be properly determined according to embodiments and is not limited to the specific numerical value.

Figure 4:
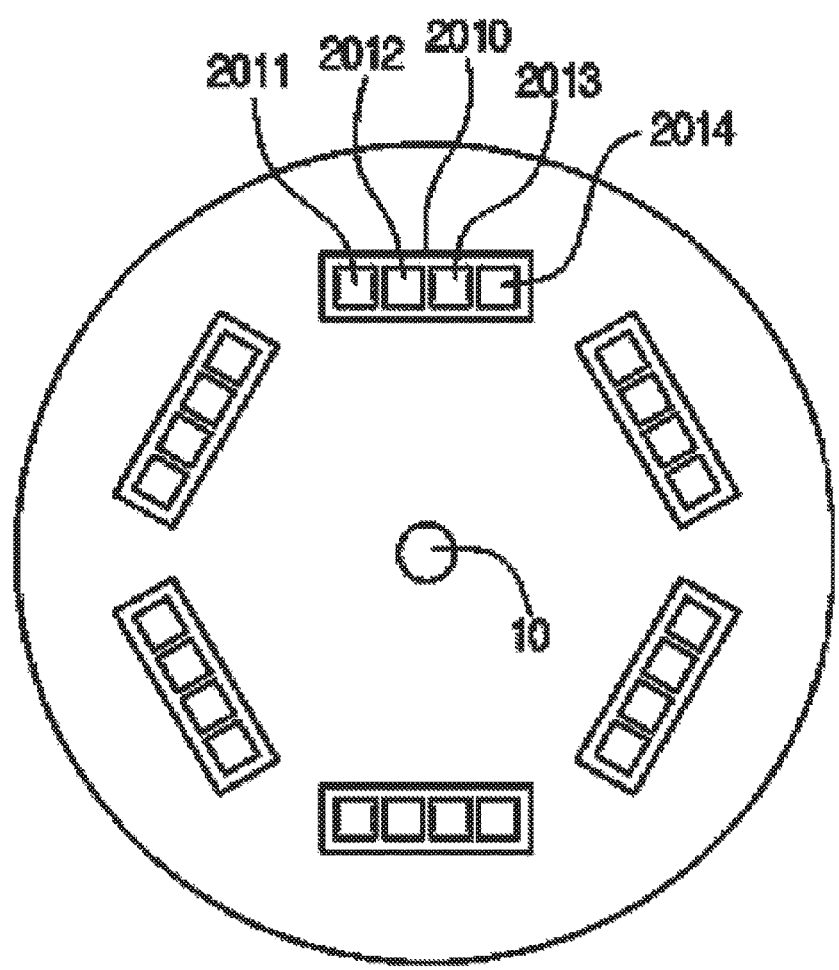
FIG. 4 is a top plan view illustrating another exemplary arrangement of light emitting devices in a camera having light emitting devices in accordance with an embodiment.

FIG. 4 is a top plan view illustrating another arrangement of light emitting devices in a camera having light emitting devices in accordance with an embodiment.

Referring to FIG. 4, similarly to FIG. 3, a plurality of light emitting devices 2011, 2012, 2013 and 2014 arranged on a substrate 200 are divided into four sets by their kinds However, an embodiment illustrated in FIG. 4 has a difference in that unit cells 2010 being a light source are arranged on the substrate 200 in a way of including the light emitting devices of each set one by one. In other words, a plurality of unit cells 2010 are arranged on the substrate 200 in such a way that each unit cell 2010 includes a first light emitting element 2011, a second light emitting element 2012, a third light emitting element 2013, and a fourth light emitting element 2014. The plurality of the unit cells 2010 may be arranged in a symmetrical form with respect to the light receiving unit 10.

In an embodiment illustrated in FIG. 4, the plurality of the unit cells 2010 are arranged at regular intervals along a virtual circle at which the light receiving unit 10 is a center of the circle. However, in another embodiment, the plurality of the unit cells 2010 may be arranged in a different pattern. For example, the plurality of the unit cells 2010 may be arranged in two-dimensional array arranged along a horizontal axis and a vertical axis that are perpendicular on the substrate.

As set forth above, in an embodiment illustrated in FIG. 4, each cell 2010 is configured by four kinds of light emitting devices irradiating light with wavelengths different from each other, and five such cells 2010 are arranged. However, this arrangement is only an example for the convenience of explanation, the kind and number of light emitting devices included in one cell 2010 and the total number of the cells 2010 may be determined according to embodiments, and are not limited to specific numerical values.

Figure 5:
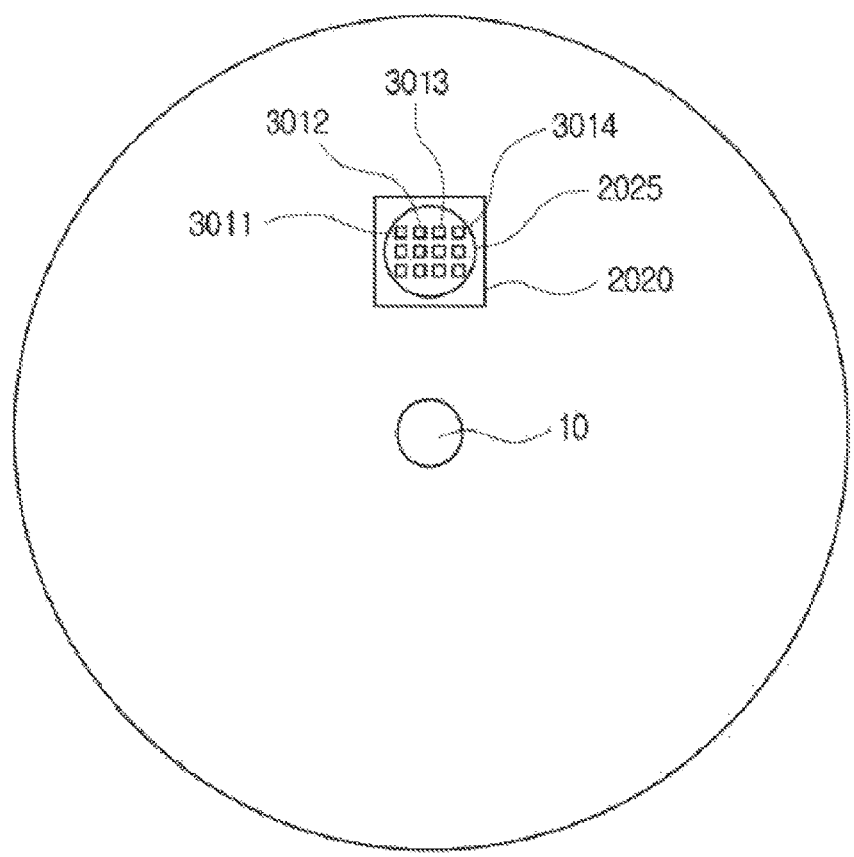
FIG. 5 is a top plan view illustrating yet another exemplary arrangement of light emitting devices in a camera having light emitting devices in accordance with an embodiment.

FIG. 5 is a top plan view illustrating yet another arrangement of light emitting devices in a camera having light emitting devices in accordance with an embodiment.

Referring to FIG. 5, one multi-chip package 2020 is disposed on the substrate 200, but the multi-chip package 2020 includes a plurality of light emitting devices configured to irradiate light with wavelengths different from one another. For example, the multi-chip package may be configured in a way of mounting four kinds of chips 3011, 3012, 3013, and 3014 on a lead frame 2025, each being configured to irradiate light having wavelengths different from one another. Unlike the embodiment illustrated in FIG. 4, the embodiment illustrated in FIG. 5 includes only one cell configured with light emitting devices which irradiate light having wavelengths different from one another.

The number of light emitting devices illustrated in FIG. 5 is merely an example for the convenience of explanation, and the number of kinds of the light emitting devices constituting the multi-chip package 2020 may be different. Further, the multi-chip package 2020 may include a plurality of light emitting devices which irradiate light having different wavelengths, but only one each light emitting devices in the multi-chip package 2020 may irradiate light having each wavelength, or the multi-chip package 2020 may include two or more light emitting devices irradiating light with the same wavelength.

Figure 6A:
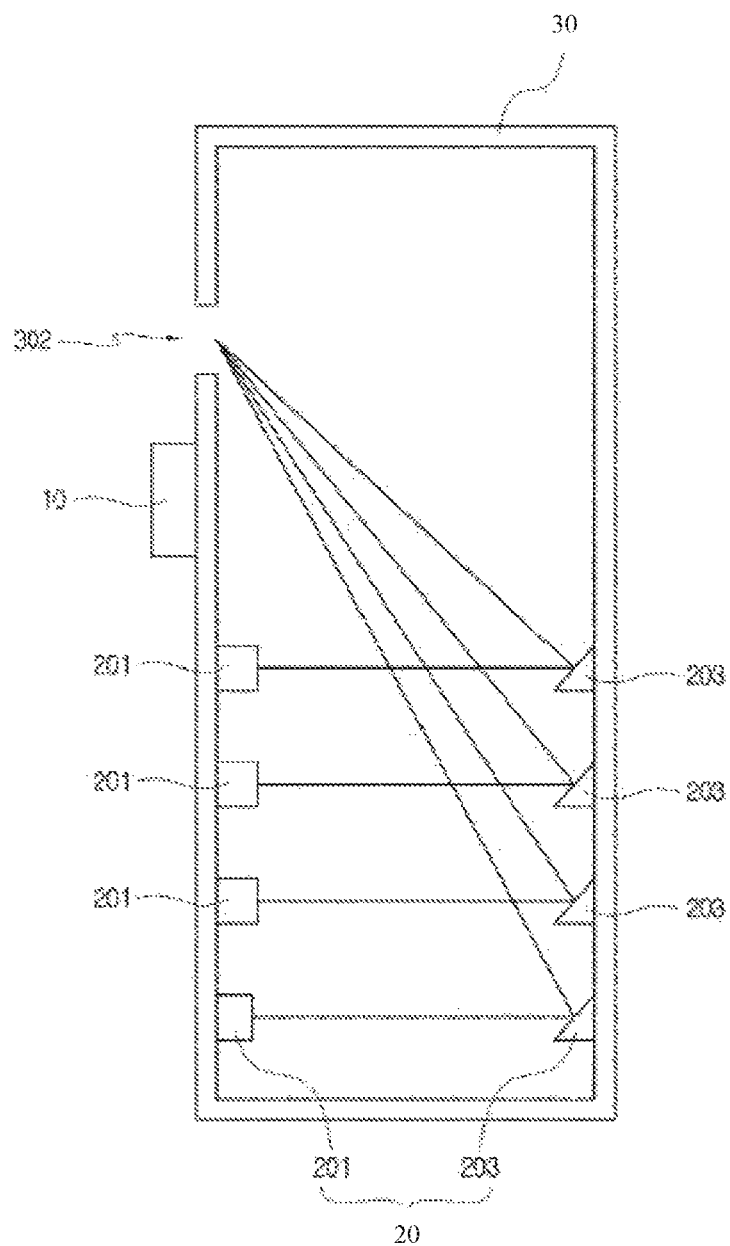
FIGS. 6A and 6B are schematic sectional views illustrating an arrangement of light emitting devices and a light transferring element in a body of a camera having light emitting devices in accordance with an embodiment.

FIG. 6A is a schematic sectional view illustrating an arrangement of light emitting devices and a light transferring element in a body of a camera having light emitting devices in accordance with an embodiment.

Referring to FIG. 6A, in accordance with an embodiment, a light emitting unit 20 in the camera having light emitting devices includes a plurality of light emitting devices 201 configured to irradiate light with wavelengths different from one another and a light transferring means for controlling a direction of the light irradiated from the plurality of light emitting devices 201. In an embodiment illustrated in FIG. 6A, the light transferring means is a reflecting plate 203, and the body 30 has a plurality of light emitting devices 201 and a plurality of reflecting plates 203 corresponding to the plurality of light emitting devices 201 disposed therein. Each of the reflecting plates 203 is configured to reflect the light irradiated from its corresponding light emitting element 201 and make the reflected light incident to an opening 302 of the body 30. To accomplish it, each of the reflecting plates 203 may be configured to adjust its angle. In addition, the angle of the reflecting plates 203 may be differed depending on locations of their corresponding light emitting devices 201. Accordingly, the light irradiated from the plurality of light emitting devices 201 is focused on the same point of the opening 302 after being reflected from each of the reflecting plates 203 and irradiated to a target located at the outside of the body 30 through the opening 302.

Figure 6B:
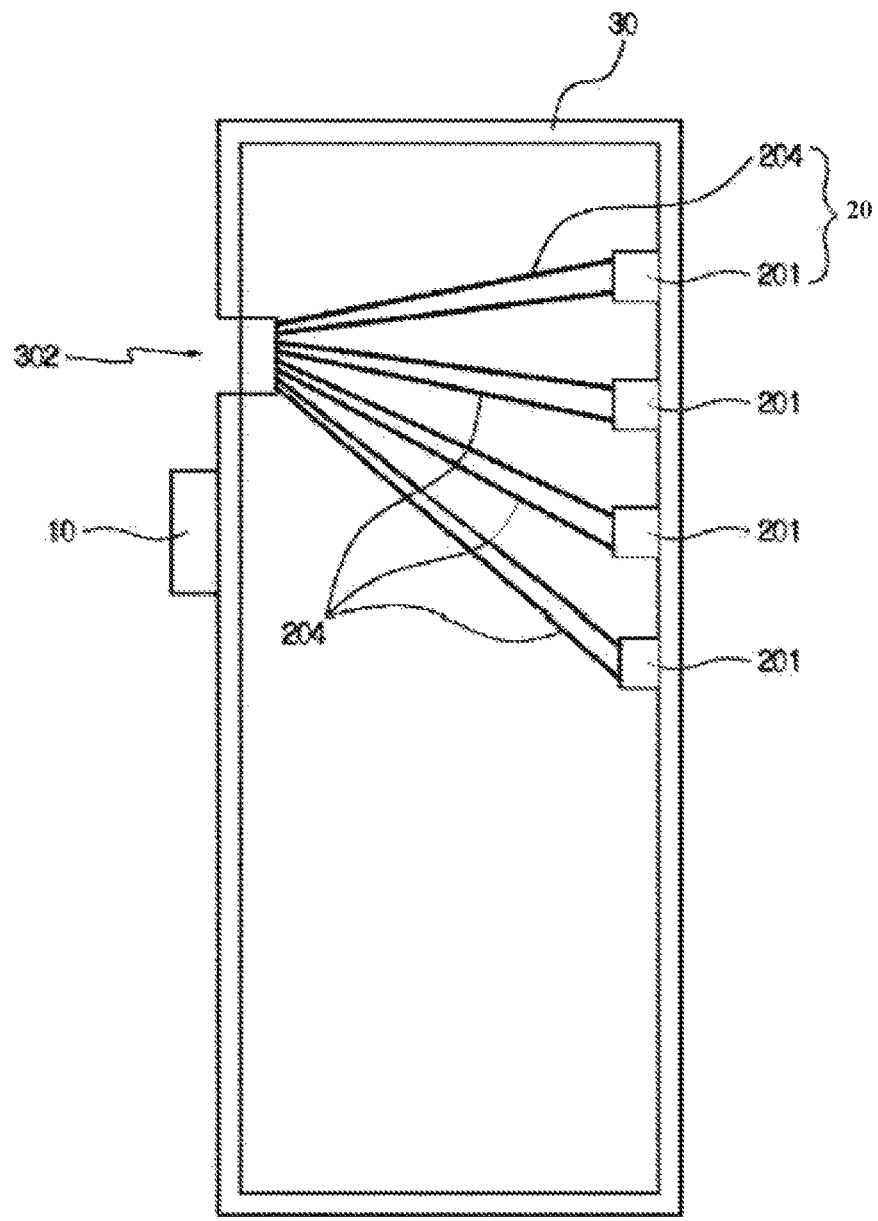

FIG. 6B is a schematic sectional view illustrating an arrangement of light emitting devices and light transferring devices in a body of a camera having light emitting devices in accordance with another embodiment.

Referring to FIG. 6B, in accordance with an embodiment, a light emitting unit 20 in the camera having light emitting devices includes a plurality of light emitting devices 201 configured to irradiate light with wavelengths different from one another and a light transferring means for controlling a direction of the light irradiated from the plurality of light emitting devices 201. In an embodiment illustrated in FIG. 6B, the light transferring unit is an optical cable 204, and the body 30 has a plurality of light emitting devices 201 and a plurality of optical cables 204 corresponding to the light emitting devices 201 disposed therein. Since the light is irradiated from each of light emitting devices 201 and propagated through the optical cable 204 corresponding to a corresponding light emitting element 201 before being incident to the opening 302 of the body 30, the light from the plurality of light emitting devices 201 may be irradiated to a target located at the outside of the body 30 through the opening 302.

The reflecting plates 203 and the optical cables 204 illustrated in FIGS. 6A and 6B are just an example of the light transferring devices, and in another embodiment, the camera having light emitting devices may include any other different light transferring means for controlling a direction of light irradiated from the light emitting devices. In addition, in embodiments illustrated in FIGS. 6A and 6B, a light receiving unit 10 has the same function as described with reference to FIG. 1, therefore, the detailed description thereof will be omitted in order to avoid the repetition of the explanation.

The camera having light emitting devices according to the embodiments described above may be used to image the skin of the target. Specifically, the camera may sequentially turn-on the plurality of light emitting devices which are configured to irradiate the light with wavelengths different from one another so that the light is irradiated to the skin of the target. Then, the light irradiated from the plurality of light emitting devices is reflected from the skin of the target, and the reflected light is received by the light receiving unit, thereby imaging the skin. In addition, in accordance with an aspect of the disclosed technology, it is possible to measure a status of the skin by using the camera having light emitting devices according to the embodiments.

Figure 7:
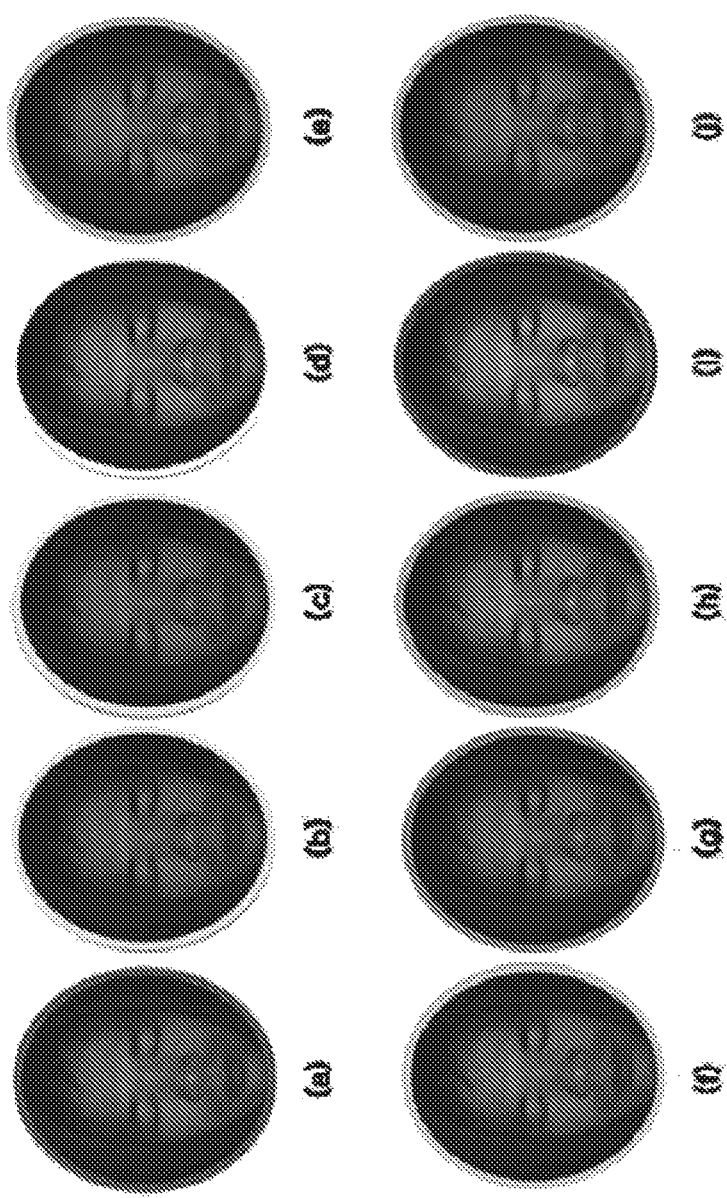
FIG. 7 shows images of a target for wavelengths, which are obtained through a method for measuring a status of a skin in accordance with an embodiment.

FIG. 7 shows images of a target for wavelengths obtained through a method for measuring a status of a skin in accordance with an embodiment.

Referring to FIG. 7, (a) to (j) of FIG. 7 illustrate images for wavelengths, which are imaged while irradiating the light with 407 nm, 417 nm, 445 nm, 470 nm, 506 nm, 520 nm, 561 nm, 573 nm, 605 nm, and 700 nm wavelengths. The images illustrated in (a) to (j) in FIG. 7 are obtained from the skin of the target, and an area to be analyzed in the respective images is selected and a brightness value of the pixels in the selected area is analyzed. As a result, it is possible to obtain an intensity of the light reflected from the skin of the target wherein the intensity of the reflected light may be obtained by wavelengths.

Figure 8:
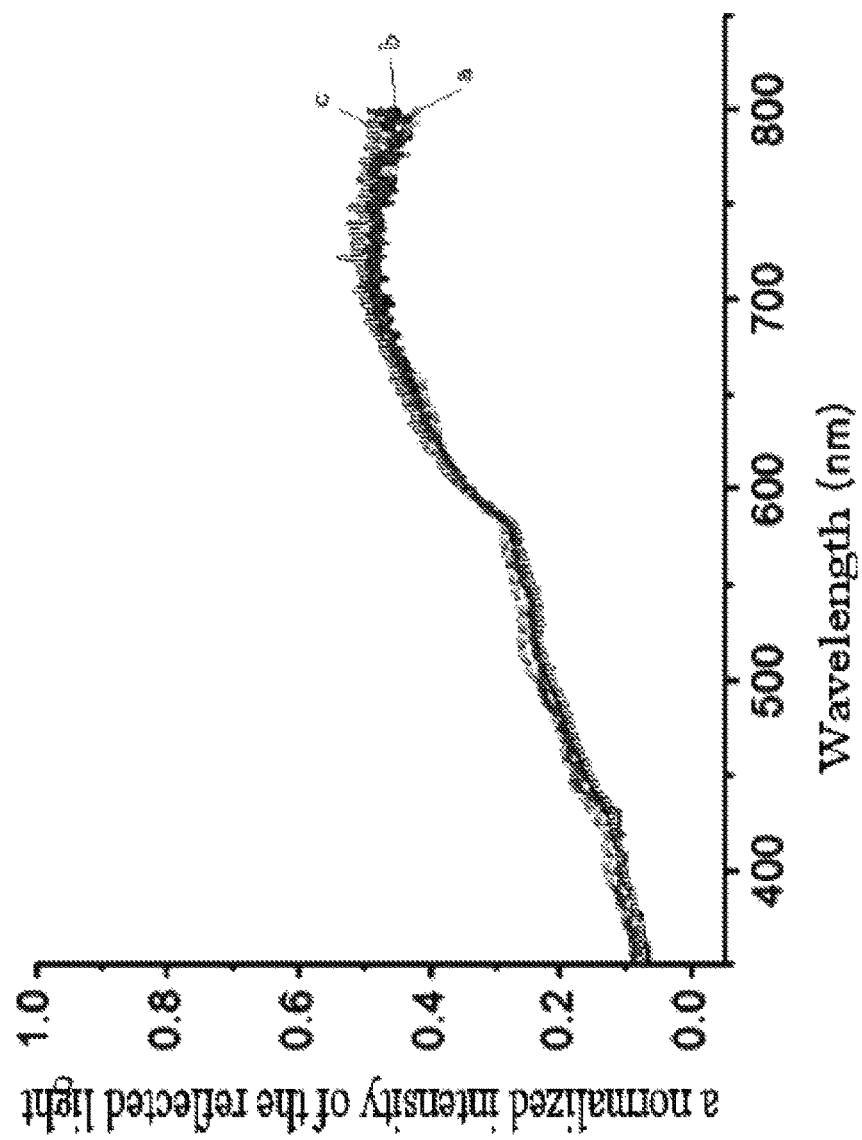
FIG. 8 is a graph illustrating strengths of reflected light for wavelengths, which is obtained through a method for measuring a status of a skin in accordance with an embodiment.

FIG. 8 is a graph illustrating strengths reflected light for wavelengths, which are obtained through a method for measuring a status of skin in accordance with an embodiment.

In FIG. 8, a horizontal axis represents the wavelength, and a vertical axis represents a normalized intensity of the reflected light. In addition, the graphs illustrated as "a", "b", and "c" in FIG. 8 represent intensities of the reflected light obtained from the different areas of the skin. As illustrated, the intensities of the reflected light from the areas on the skin of the target may be obtained by wavelengths. As described above with reference to table 1, the indices of collagen, melanin, oxy/deoxyhemoglobin, moisture, and thickness of a skin layer influence on a spectrum of a specific wavelength bandwidth in the light reflected from the skin. Accordingly, it is possible to measure a distribution or a degree of the indices with respect to the skin from the graphs in FIG. 8.

While the description of the disclosed technology has been made to the exemplary embodiments illustrated in drawings, it will be understood to those skilled in the art that it is only an example and various changes and modifications can be made therefrom. However, it should be deemed that such modifications fall within the technical scope of the disclosed technology. Therefore, the scope of the disclosed technology is not limited by the foregoing embodiments.

What is claimed is:

1. A camera having light emitting devices, comprising:
    a substrate;
    a light emitting unit located on the substrate and irradiating light to a skin, the light irradiated by the light emitting unit being reflected by the skin; and
    a body coupled to the substrate and structured to expose the light emitting unit through a first optically transparent region formed on the body, the light irradiated to the skin through the first optically transparent region;
    a light receiving unit located on the body positioned to receive the reflected light; and
    a cover coupled to the body and located on sides of the light receiving units, the cover extending from the body to an upper area in a direction parallel to the substrate, the cover structured to expose the light receiving unit through a second optically transparent region formed on the cover, the reflected light received through the second optically transparent region, the second optically transparent region non-overlapping with the first optically transparent region, and
    wherein the light emitting unit comprises a plurality of sets of the light emitting devices;
    each of the sets comprises one or more light emitting devices to irradiate the light with substantially the same wavelength; and
    each of the sets sequentially irradiates the light with a wavelength that is different from other sets.

2. The camera having light emitting devices of claim 1, wherein the light emitting devices arranged in the same pattern.

3. The camera having light emitting devices of claim 2, wherein the pattern has a symmetric form with respect to the light receiving unit.

4. The camera having light emitting devices of claim 1, further comprising:
    a driving unit electrically connected to the light emitting unit and transmitting an independent driving signal to each of the sets.

5. The camera having light emitting devices of claim 1, wherein the light emitting unit further comprises a first polarizer to polarize the light irradiated by the light emitting devices to a first direction; and
    the light receiving unit comprises an imaging element and a second polarizer to polarize the reflected light to a second direction and to make the reflected light incident to the imaging element.

6. The camera having light emitting devices of claim 5, wherein the first direction and the second direction are parallel to each other.

7. The camera having light emitting devices of claim 5, wherein the second direction is different from the first direction.

8. The camera having light emitting devices of claim 1, wherein the light emitting unit further comprises light transferring devices which are configured to make the light irradiated by the light emitting devices incident to the optically transparent region.

9. The camera having light emitting devices of claim 8, wherein the light transferring devices comprises reflecting plates or optical cables.

10. A method for imaging a skin, comprising:
    irradiating light to the skin of a target by sequentially turning on a plurality of sets of light emitting devices, the plurality of sets of the light emitting devices disposed on a substrate coupled to a body that is structured to expose the plurality of sets of the light emitting devices through a first optically transparent region formed on the body and the light irradiated to the skin through the first optically transparent region; and
    receiving at a light receiving unit the reflected light which is generated from the plurality of sets and reflected from the skin of the target, the light receiving unit located on the body, wherein each set comprises one or more light emitting devices to irradiate light with substantially the same wavelength that is different from other sets, and wherein the reflected light is received through a second optically transparent region formed on a cover coupled to the body and located on sides of the light receiving unit, the cover extending from the body to an upper area in a direction parallel to the substrate.

11. The method for imaging the skin of claim 10, wherein irradiating light to the skin of a target comprises turning on each of the sets by using an independent driving signal.

12. The method for imaging the skin of claim 10, wherein irradiating light to the skin of a target comprises:
polarizing the light from the light emitting devices to a first direction using a first polarizer; and
receiving reflected light at the light receiving unit comprises:
polarizing the reflected light to a second direction using a second polarizer.

13. The method for imaging the skin of claim 12, wherein the first direction and the second direction are parallel to each other.

14. The method for imaging the skin of claim 12, wherein the first direction is different from the second direction.

15. The method for imaging the skin of claim 10, wherein irradiating light to the skin of a target comprises:
making the light irradiated from the light emitting devices incident to the first optically transparent region by using a light transferring devices.

16. The method for imaging the skin of claim 15, wherein the light transferring devices comprise reflecting plates or optical cables.

17. The camera having light emitting device of claim 1, wherein the one or more light emitting devices in each of the sets are disposed in different directions from the light receiving unit by a same distance.

18. The camera having light emitting device of claim 1, wherein the body has a thickness greater than a thickness of the cover.

19. The method for imaging the skin of claim 15, wherein the one or more light emitting devices in each of the sets are disposed in different directions from the light receiving unit by a same distance.

20. The method for imaging the skin of claim 15, wherein the body has a thickness greater than a thickness of the cover.

* * * * *